United States Patent
Vrehen

(10) Patent No.: US 6,596,984 B2
(45) Date of Patent: Jul. 22, 2003

(54) OPTICAL SCANNING UNIT COMPRISING A DETECTION SYSTEM FOR DETECTING THE POSITION OF A MOVABLE ELEMENT WITHIN THE UNIT

(75) Inventor: Joris Jan Vrehen, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/747,103

(22) Filed: Dec. 21, 2000

(65) Prior Publication Data

US 2001/0014069 A1 Aug. 16, 2001

(30) Foreign Application Priority Data

Dec. 24, 1999 (EP) .............................................. 99204550

(51) Int. Cl.[7] ................................................. H01I 3/07
(52) U.S. Cl. ..................................... 250/234; 250/201.2
(58) Field of Search ................................. 250/234, 235, 250/201.2, 201.4, 201.5; 356/3.1, 4.03, 3.05

(56) References Cited

U.S. PATENT DOCUMENTS 4,423,496 A * 12/1983 Opheij et al. ................ 250/202
6,229,771 B1 * 5/2001 Kosoburd et al. ...... 369/112.12

* cited by examiner

*Primary Examiner*—David V. Bruce
*Assistant Examiner*—Hoon K. Song
(74) *Attorney, Agent, or Firm*—Michael E. Belk

(57) ABSTRACT

In an optical unit for scanning an information plane having a track structure by means of a scanning spot, which unit is provided with a pivotable mirror for fast movement of the scanning spot perpendicular to the track direction, the angular position of the mirror is determined by means of a flat weakly reflecting plate element, arranged in the path of the scanning beam, which reflects part of the scanning beam to a mirror position detector having two detector elements. By arranging the reflecting surface of the flat weakly reflecting plate element skew in the scanning beam, the mirror position detector can be arranged in the same plane as the information detector of the optical unit.

8 Claims, 4 Drawing Sheets

OPTICAL SCANNING UNIT COMPRISING A DETECTION SYSTEM FOR DETECTING THE POSITION OF A MOVABLE ELEMENT WITHIN THE UNIT

BACKGROUND OF THE INVENTION

1. Technical Field

The invention relates to an optical unit for scanning an information plane having an optically readable and trackwise arranged structure, which unit comprises a radiation source for supplying a radiation beam, an objective system for focusing the radiation beam to a scanning spot in the information plane, an adjustable element arranged between the radiation source and the objective system for moving the scanning spot transversely to the track direction, a radiation-sensitive detection system for converting the radiation beam from the information plane into electric signals, and a position detection system for determining the position of the adjustable element.

2. Related Art

An optical unit of this type can be used in an optical disc player, such as the well-known CD or CD-ROM players and optical players based on the principle of these players, to guide a radiation beam to an information plane of an optical record carrier and from the record carrier to a radiation-sensitive detection system. If the record carrier is provided with user information, such as an audio program or a video program, the radiation beam from the radiation source is an unmodulated beam and this beam is modulated by the information structure in the information plane. The modulated beam from the record carrier is converted by the radiation-sensitive detection system into an electric signal representing the information which is being read out. If the record carrier is a blank record carrier, the beam from the source is modulated with information to be written and the radiation-sensitive detection system is used only for deriving servosignals.

One of the great advantages of a disc system is that the recorded information is random accessible. The scanning spot can be positioned on each arbitrary track by moving the optical unit and the disc with respect to each other in the radial direction, i.e. a direction transverse to the track direction. Because of the small weight of the optical unit, such a movement can be performed at a relatively fast rate. For new applications of the optical disc, it becomes necessary to further reduce the access time. It has already been proposed to realize faster access by inserting a movable element, for example, a mirror which deflects the beam over the aperture of the objective system so that the spot formed by the objective system is displaced transversely to the track direction. Use is then made of the fact that the objective system has an image field which is relatively large compared to the diameter of the spot, so that the spot still has a good quality in the case of a moderate movement of the spot within this field. In order to maintain the high spot quality, i.e. to keep the axis of the radiation beam close to the center of the objective system, during a fast radial movement of the spot, the objective system is also displaced, but at a smaller rate than the mirror. The displacement of the objective system should be related to the deflection of the beam by the mirror, so that the optical unit should comprise a position detection system for determining the angular position of the mirror.

An optical read/write unit comprising such a position detection system is known per se, for example, from U.S. Pat. No. 4,423,496 to Opheij et al. This patent relates to an improvement of the tracking servosystem for maintaining the center of the scanning spot on the center line of the track being scanned. A tracking error signal, needed for a spot position correction, is obtained by projecting the radiation beam from the information plane on two detector elements, which occupy different radial positions with respect to the information track structure, and by subtracting the output signals of these detector elements. The tracking error signal is supplied to the drives of a pivotable mirror. This mirror deflects the radiation beam so as to fine-position the center of the spot on the center line of the track being scanned. However, movement of the mirror causes a change of the radiation intensity distribution on the position detector elements, which change is independent of the position of the spot with respect to the track being scanned. The tracking error signal is thus dependent on the angular position of the mirror. To eliminate this dependency, a position detection system is used to determine the angular position of the mirror, and the output signal of this system is combined with the tracking error signal to correct the tracking error signal and make this signal independent of the mirror position. The mirror position detection system described in U.S. Pat. No. 4,423,496 uses either a separate position-sensing beam reflected at the rear side of the mirror and two detection elements arranged at this rear side, or a portion of the radiation beam transmitted by the pivotable mirror, or a portion of the radiation beam reflected by a surface in front of the mirror. In all of the embodiments of this mirror position detection system, the position detection elements are arranged in a plane which is different from the plane of the radiation-sensitive detection system.

SUMMARY OF THE INVENTION

It is an object of the present invention to provide a fast-access optical unit, wherein the range of movement of the movable element is minimum and the signal from the position detection system is used to control the movement of at least the objective system by means of a dedicated and attractive position detection system.

This optical unit is characterized in that the position detection system comprises a weakly reflecting element arranged in the path of the radiation beam between the adjustable element and the objective system for reflecting a portion of the radiation beam as a position-sensing beam towards a radiation-sensitive position detector comprising at least two detector elements.

Not only the function, but also the construction of this position detection system is different from that described in U.S. Pat. No. 4,423,496.

The optical unit is also characterized in that the normal to the reflecting plane of the weakly reflecting element extends at a small angle to the optical axis of the objective system.

By this measure, the position-sensing beam is spatially separated from the radiation beam.

The detection system is further characterized in that the position detector is arranged in the same plane as the radiation-sensitive detection system.

The position detector and the detection system may then be integrated in one component so that the number of components of the optical unit as well as alignment problems can be reduced.

A first embodiment of the optical unit is characterized in that the reflecting element is a weakly reflecting flat plate, in which the normal to the plate surfaces extends at a small angle to the optical axis of the objective system.

A second embodiment of the optical unit is characterized in that the reflecting element is a weakly reflecting wedge having a small wedge angle.

A third embodiment of the optical unit, which comprises a λ/4 plate arranged between the movable element and the objective system, is characterized in that the weakly reflecting element is constituted by an uncoated surface of the λ/4 plate, which surface faces the objective system.

The λ/4 plate may be used in an optical unit wherein the radiation beam delivered by the radiation source is linearly polarized, either to prevent radiation from being coupled back to the radiation source or, in combination with a polarizing beam splitter, to separate the beam reflected by the information plane from the radiation beam to the record carrier.

By using the λ/4 plate as the weakly reflecting element, the number of components of the optical unit is reduced to a minimum. Optimum use is thus made of the facts that an uncoated surface has a reflection of the order of 4% and that the position-sensing beam needs to have only a low intensity. It also suffices for the previous embodiments when one of the surfaces of the weakly reflecting element is uncoated, so that this element does not need to have a beam-separating layer.

The above embodiments may be further characterized in that the movable element is a plane mirror.

The invention also relates to an apparatus for reading information from and/or writing information in an information layer of an optical record carrier, which apparatus comprises supporting means for the record carrier, an optical unit for supplying a scanning beam focused to a scanning spot on the information layer, and means for moving the record carrier and the optical unit relative to each other. This apparatus is characterized in that the optical unit is a unit as described above.

BRIEF DESCRIPTION OF THE DRAWINGS

The invention will now be elucidated, by way of non-eliminative example, with reference to the accompanying drawings. In the drawings.

DETAILED DESCRIPTION OF THE EMBODIMENTS

Figure 1:
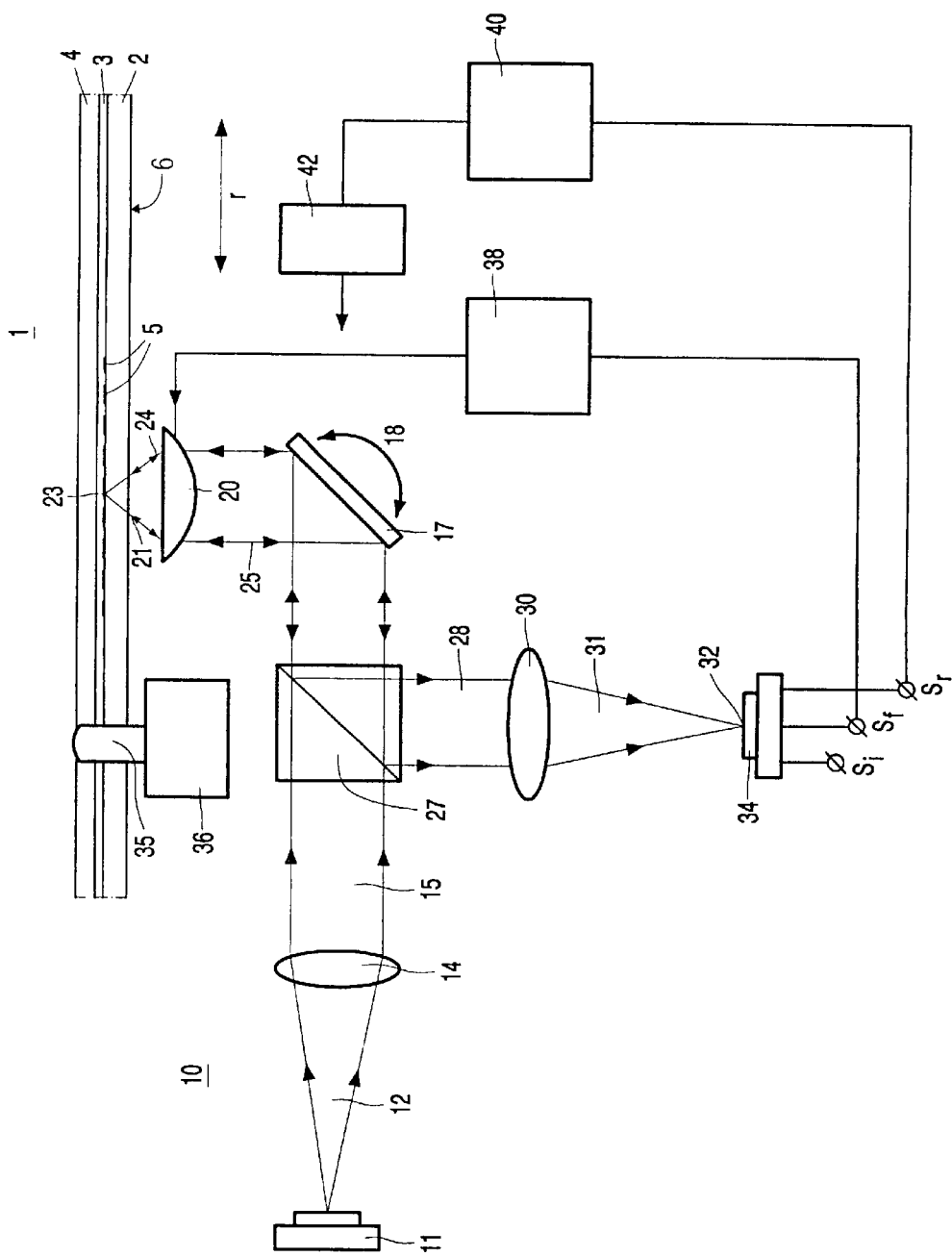
FIG. 1 is a cross-section of an apparatus for reading an optical record carrier.

FIG. 1 shows part of a round disc-shaped record carrier 1 in a radial cross-section. This record carrier 1 comprises a transparent layer 2, one side of which is provided with an information layer 3. The information layer 3 may be protected against environmental influences by a protective layer 4. The side of the transparent layer 2, facing the optical unit 10, is referred to as the entrance plane 6. The transparent layer 2 may constitute a mechanical support for the information layer 3. It is also possible that the transparent layer 2 only serves as a protective layer for the information layer 3. The mechanical support for the information layer 3 may then be provided by a further layer at the other side of the information layer 3, for example, by the protective layer 4 or, in the case of a record carrier with two information layers, by a second information layer and a transparent layer arranged against the information layer 3. The information may be recorded in the information layer 3 in the form of optically detectable areas arranged in substantially parallel, concentric or spiral information tracks 5. In FIG. 1, these information tracks 5 extend within areas having in a direction perpendicular to the plane of the drawing. These areas may have any optically detectable form. For example, these areas may be pits in the information layer 3, or areas having a reflection coefficient or a magnetization direction different from their surroundings, or a combination of these forms.

The optical unit 10 comprises a radiation source 11, for example a laser diode, which emits a divergent beam 12. A collimator lens 14 converts this divergent beam 12 into a collimated or parallel scanning beam 15. This scanning beam 15 is incident on a pivotable reflecting mirror 17, which reflects the scanning beam 15 as reflected collimated beam 25 to an objective system 20. The objective system 20 converts the scanning beam 15 into a first convergent beam 21 and focuses this first convergent beam 21 to a radiation spot A, the scanning spot 23, on the information layer 3. In FIG. 1, the objective system 20 is represented by a single lens element, which may have one or two aspherical surface (s). The objective system 20 may also comprise several lens elements, or a hologram.

During reading or writing information, the record carrier 1 is rotated by a shaft 35, driven by a motor 36, so that one information track 5 is scanned. By moving the scanning spot 23 and the record carrier 1 relative to each other in the radial direction r, all the concentric information tracks 5 or the complete spiral information track 5 can be scanned. The latter movement can be realized by mounting the optical unit 10 or part thereof comprising at least the objective system 20 on a sledge (not shown), which is movable in the radial direction r. When record information is being read, radiation of the first convergent beam 21, reflected by the information layer 3, is modulated with the information recorded in the successive information areas. This reflected information forms a first reflected scanning beam 24 which returns along the path of the first convergent beam 21. The objective system 20 converts this first convergent beam 21 into a collimated beam 25, which is reflected by the pivotable reflecting mirror 17. A beam separator 27, for example a semitransparent mirror or prism, is arranged in the radiation path of the ongoing scanning beam 15 and the returning collimated beam 25. This beam separator 27 transmits part of the radiation of the scanning beam 15 towards the record carrier 1, and also reflects part of the scanning beam 15 and the returning collimated beam 25 as the second reflected beam 28 towards an information detector 34 of a radiation-sensitive position detection system 47. The second reflected beam 28, reflected by the beam separator 27, passes a positive lens 30, which converts this second reflected beam 28 into a second convergent beam 31 and focuses the second convergent beam 31 in a first detection spot 32 in the plane of the information detector 34 of radiation-sensitive position detection system 47. This radiation-sensitive position detection system 47 converts the radiation of the second convergent beam 31 into electric signals. One of these signals is an information signal Si, which represents the information read from the information layer 3. Another signal is a focus error signal Sf which represents a possible axial deviation of the focus of the scanning spot 23 with respect to the information layer 3. This focus error signal Sf, which can be generated in several ways and is known per se, is used as an input signal for a focus control circuit 38. This focus control circuit 38 drives an axial actuator, not shown in FIG. 1, such that the axial position of the focus of the scanning spot 23 coincides with the plane of the information layer 3. A further signal supplied by the radiation-sensitive position detection system 47 is a tracking error signal Sr, which represents a possible deviation of the center of the scanning spot 23 from the center line of the information track 5 being scanned. This tracking error signal Sr, which can also be generated in several ways and is known per se, is used as an input signal for a track control circuit 40. This track control circuit 40 drives a radial actuator 42, which is an actuator for moving either the whole optical unit 10, or only the objective system 20 in the radial direction r, or an actuator for pivoting the pivotable reflecting mirror 17 in the direction of the arrow 18.

When information is being written in the information layer 3, the scanning beam 15 from the source 11 is modulated with the information to be written. This modulation may be performed by a separate modulator (not shown), for example an acousto-optic modulator, which is arranged in the path of this scanning beam 15 and controlled by the information to be written. The modulation can also be realized by directly supplying the radiation source 11 with the information to be written. Also when information is being written, the radiation-sensitive position detection system 47 can supply a focus error signal Sf and a tracking error signal Sr. The information signal Si read from the information layer 3 may then, for example, comprise information about data pre-recorded on the record carrier 1, such as addresses, which are used during writing of the information proper.

To allow reading information from, or writing information on, an arbitrary position in the information layer 3, the apparatus should provide fast access to such a position. This need for fast access, or short access time, becomes even more manifest if the information content of the record carrier 1 increases. If the distance between the start position and the required information track 5 is relatively large, the scanning spot 23 can be moved to the area of this information track 5 by displacing the optical unit 10. A movable element within the optical unit 10 can be used for positioning the scanning spot 23 on the required information track 5. This movable element may be constituted by the pivotable reflecting mirror 17. This pivotable reflecting mirror 17 has a low mass and can be moved quickly. If there is a small distance between the start position and the required information track 5, the scanning spot 23 can be moved through this distance by only pivoting the pivotable reflecting mirror 17. By pivoting this pivotable reflecting mirror 17, the direction of the scanning beam 15 changes. The change of direction is translated by the objective system 20 into a linear displacement of the scanning spot 23 in the radial direction r. Use is then made of the fact that the image field of the objective system 20 has a certain extent. To maintain the required, diffraction-limited, quality of the scanning spot 23 when deflecting the scanning beam 15, the position where the deflected collimated beam 25 enters the objective system should not deviate too much from the axis of the objective system 20. In order to fulfil this requirement, the radial position of the objective system 20 can also be controlled by means of a further control circuit, which has a lower control band than that of the pivotable reflecting mirror 17, such that also the objective system 20 has a spot-moving function. The pivotable reflecting mirror 17 is then used to realize small movements at a relatively high velocity, whereas larger movements of the scanning spot 23 at a smaller velocity are realized by displacing the objective system 20. The pivotable reflecting mirror 17 then only needs to be pivoted through a small range around its mid-position.

The displacement of the objective system 20 should be dependent on the deflection by the pivotable reflecting mirror 17. When the deflection angle of the pivotable reflecting mirror 17 has reached a certain value, the objective system 20 should be displaced in such a way that it moves the scanning spot 23 through a distance which is equal to or larger than the distance through which this scanning spot 23 has been moved by the pivotable reflecting mirror 17, and the pivotable reflecting mirror 17 is simultaneously reset to its mid-position or further backwards. In order to realize this, the angular position of the pivotable reflecting mirror 17 should be determined.

Figure 2:
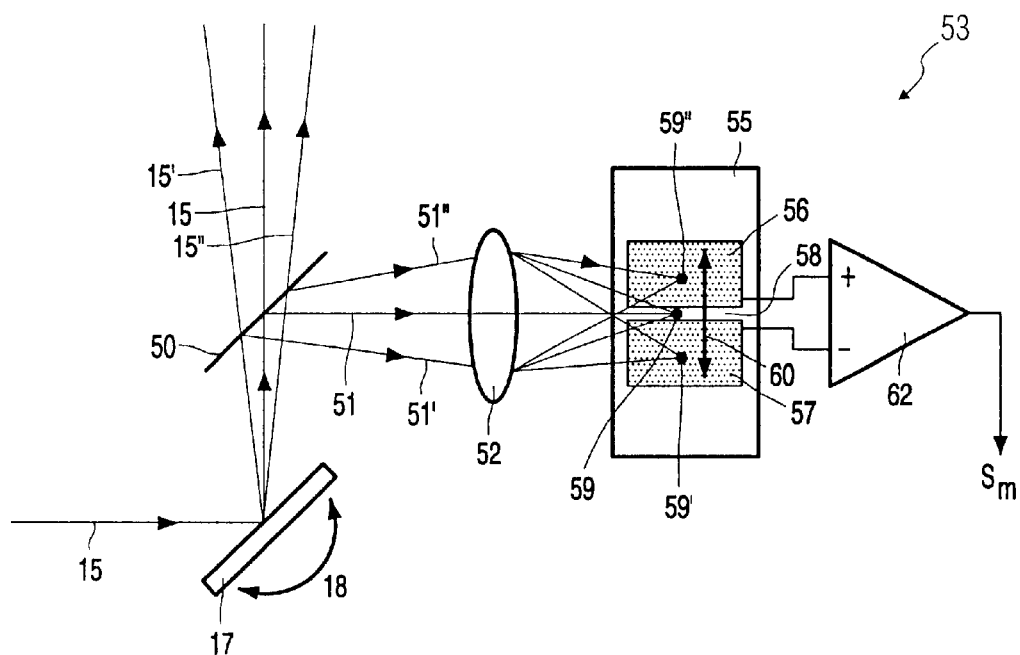
FIG. 2 shows the principle of the mirror position detection method of the present invention.

FIG. 2 shows the principle of the mirror position detection system 53 of the present invention. In FIG. 2, only those elements which are relevant for the mirror position detection system 53 are shown. For the sake of clarity, only the chief ray of the scanning beam 15 incident on the pivotable reflecting mirror 17 and reflected by this pivotable reflecting mirror 17 is shown. A weakly reflecting element 50 is arranged in the path of the scanning beam 15 reflected by the pivotable reflecting mirror 17. This reflecting element 50 reflects only a minor part, for example less than 10%, of the radiation of the scanning beam 15 as a sensing beam 51 towards a radiation-sensitive mirror position detector 55. This mirror position detector 55 has at least two separate detector elements, represented by first and second detector elements 56 and 57, respectively, which are separated by a slit 58. A lens system 52 is arranged between the weakly reflecting element 50 and the mirror position detector 55 to focus the sensing beam 51 in a detector spot 59 in the plane of the mirror position detector 55. For better understanding, this plane is rotated through 90° with respect to the other elements of the mirror position detection system 53. The output signals of the representative first and second detector elements 56 and 57 are supplied to the input ports of a differential amplifier 62. The output signal Sm of the differential amplifier 62 is a measure of the angular position of the pivotable reflecting mirror 17. This output signal Sm is supplied to the driving circuit(s) for the objective system 20, i.e., the focus control circuit 38, the track control circuit 40, and/or the radial actuator circuit 42 (FIG. 1).

The mirror position detection system 53 is designed in such a way that, if the pivotable reflecting mirror 17 is in the mid-position and the scanning beam 15 has the nominal direction, the center of the detector spot 59 is situated midway between the representative first and second detector elements 56 and 57. These representative first and second detector elements 56 and 57 then receive the same amount of radiation so that their output signals are equal and the output signal Sm is zero. When the pivotable reflecting mirror 17 is pivoted, the detector spot 59 moves in the plane of the mirror position detector 55 along the double arrow 60. If the pivotable reflecting mirror 17 is turned to the left, the scanning beam 15 reflected by this pivotable reflecting mirror 17 is deflected to the left, as indicated by the leftmost chief ray 15'. The sensing beam 51 is then deflected downwards, as indicated by the lowermost chief ray 51' and the detector spot 59 moves downwards, for example to the lower detector spot position 59'. First detector element 56 then receives less radiation than second detector element 57 and the output signal Sm has a negative value. If the pivotable reflecting mirror 17 is turned to the right, the scanning beam 15 deflected by this pivotable reflecting mirror 17 is deflected to the right, as indicated by the rightmost chief ray 15". The sensing beam 51 is then deflected upwards, as indicated by the uppermost chief ray 51" and the detector spot 59 moves upwards, for example to the upper detector spot position 59". First detector element 56 then receives more radiation than second detector element 57 and the output signal Sm has a positive value. In this way, both the value and the sign of the angle through which the pivotable reflecting mirror 17 is pivoted can be determined. The situation depicted in FIG. 2 may represent a practical embodiment wherein the lines of the chief rays 15' and 15" correspond to the maximum amount of deflection, in the positive and negative direction, imparted to the parallel beam 15 by the pivotable reflecting mirror 17, and the lower and upper detector spots 59' and 59" correspond to the detector spots associated with the maximum deflections.

Figure 3:
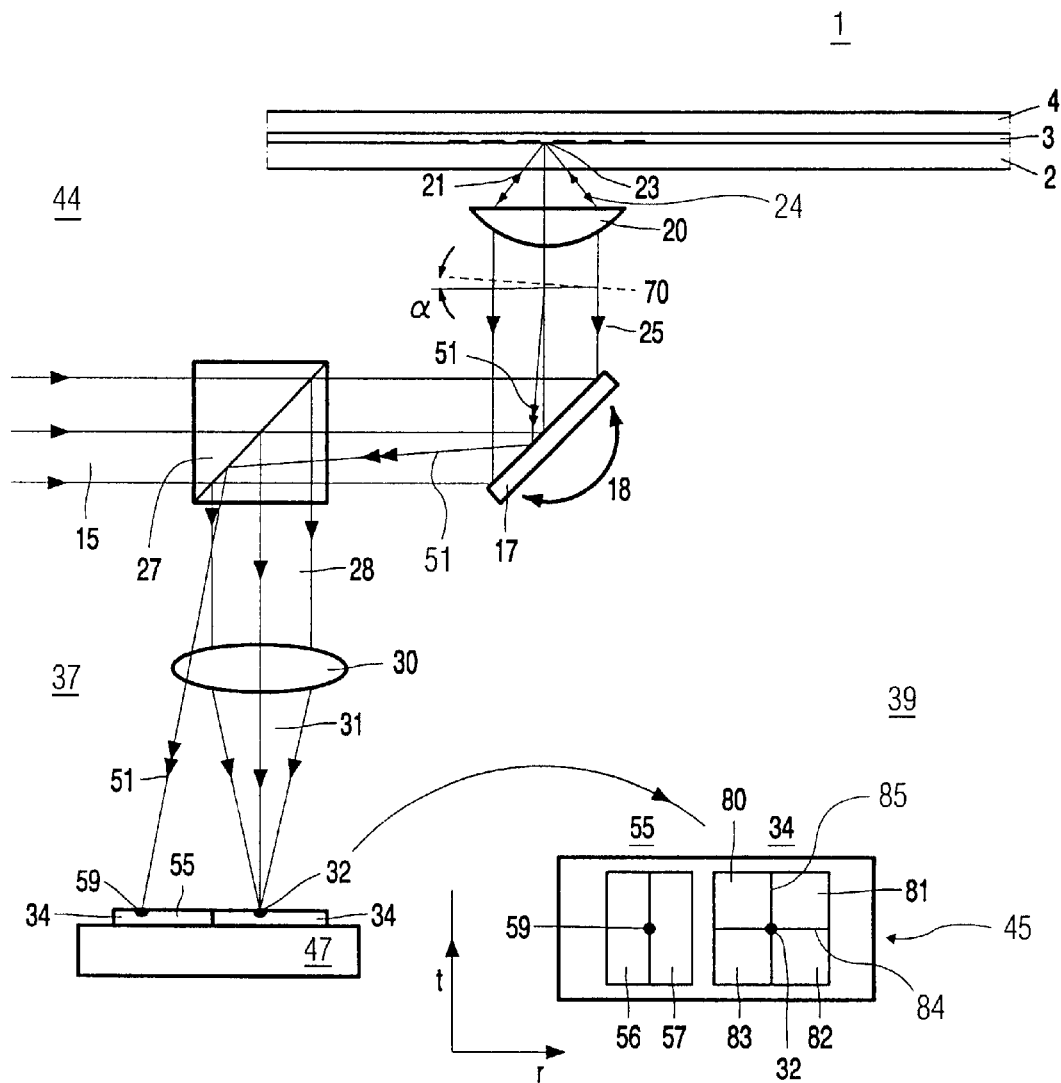
FIG. 3 shows a first embodiment of the optical unit wherein the invention is implemented.

FIG. 3 shows a part of a first embodiment of an optical unit 37 with the mirror angular position detection system 44 of the invention. The flat weakly reflecting plate element 70 is constituted by a material 70 which substantially transmits the radiation of the scanning beam 15 and reflects only a small part of this radiation, as the sensing beam 51. For the sake of clarity, only the chief ray of the sensing beam 51 is shown. The sensing beam 51 is directed to the plane of the information detector 34 in the same way and by the same elements, pivotable reflecting mirror 17 and beam separator 27, as the collimated beam 25, the second reflected beam 28, and the second convergent beam 31, and focused to a detector spot 59 in this plane by the positive lens 30.

The plane of the flat weakly reflecting plate element 70 is arranged at a small angle $\lambda$, on the order of approximately 10° or smaller, with respect to a plane perpendicular to the axis of the objective system 20. Due to this skew arrangement of the flat weakly reflecting plate element 70, the reflected sensing beam 51 is spatially separated from the scanning beam 15, so that the detector spot 59 is separated from the first detection spot 32. It will thus be possible to arrange the first and second detector elements 56, 57, respectively, of the mirror position detector 55 in the same plane as the detector elements 80, 81, 82, 83 of the information detector 34 and to integrate all the detector elements 56, 57, 80, 81, 82, 83 in one angular detection device 39. Such an integration reduces the costs of the optical unit 37, because fewer elements are required and alignment becomes easier. A top view of such a an angular detection device 39 is shown at the right bottom part of FIG. 3. This angular detection device 39 comprises the signal, focus error and tracking error detectors of the information detector 34 in the form of a quadrant detector 45 and the two detector elements 56, 57 of the mirror position detector 55.

Instead of the flat weakly reflecting plate element 70 arranged at a small angle $\lambda$, an optical wedge (not shown), having a small wedge angle, can be arranged in the sensing beam 51, in which the skew surface of this wedge acts as the weak reflecting element.

Figure 4:
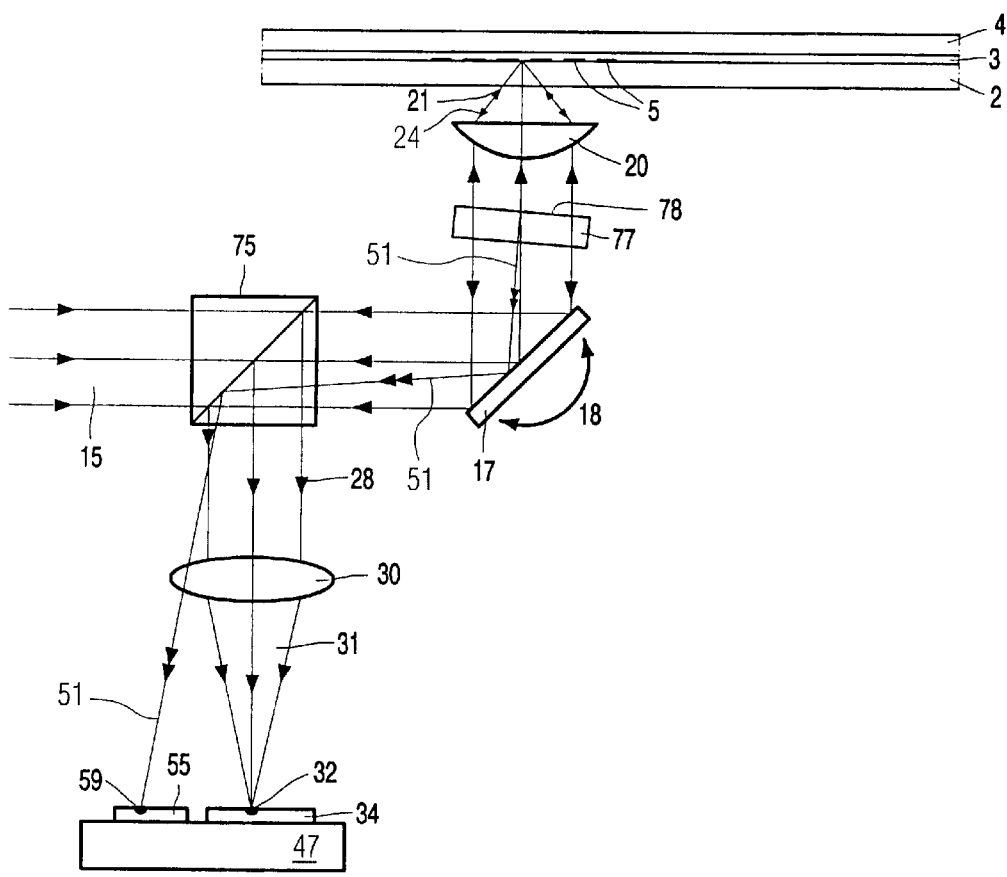
FIG. 4 shows a second embodiment of such an optical unit.

FIG. 4 shows a part of a second embodiment of the optical unit 10 with the mirror angular position detection system 44 of the invention. In this embodiment, the reflected sensing beam 51 is separated from the ongoing scanning beam 15 by the combination of a polarizing beam-splitting prism 75 and a $\lambda/4$ waveplate 77, where $\lambda$ is the radiation wavelength of the scanning beam 15. This scanning beam 15 is linearly polarized in a direction corresponding to the transmission direction of the polarizing beam splitting prism 75 so that the scanning beam 15 is fully transmitted to the pivotable reflecting mirror 17 and the record carrier 1. On its way to and from the record carrier 1, the scanning beam 15 passes through the $\lambda/4$ waveplate 77 twice so that its direction of polarization is rotated through 90° in total when the (reflected) sensing beam 51 arrives again at the beam splitting prism 75. The first reflected scanning beam 24 is then reflected by the beam splitting prism 75 towards the radiation-sensitive position detection system 47. It is compared with the semi-transparent mirror of beam separator 27 of FIGS. 1 and 3, the combination of the beam splitting prism 75 and the $\lambda/4$ waveplate provide the advantage that the reflected sensing beam 51 can be separated from the ongoing scanning beam 15 without loss of radiation. The $\lambda/4$ waveplate is conventionally provided with an anti-reflection coating on both surfaces to prevent reflection at these surfaces.

According to the invention, one of these surfaces is not coated. The normal reflection of such an uncoated surface, of the order of 4%, is sufficient to use the radiation reflected by this surface as position-sensing radiation. The uncoated surface 78 of the waveplate 77 should be the upper surface of the waveplate 77 so that the radiation of the sensing beam 51 also passes through the $\lambda/4$ waveplate twice and the sensing beam 51 is reflected by beam splitting prism 75 towards the mirror position detector 55. Like the flat weakly reflecting plate element 70 in FIG. 3, the $\lambda/4$ waveplate 77 is arranged skew in the scanning beam 15, so that the sensing beam 51 is spatially separated from the scanning beam 15, and the detector elements of the sensing beam 51 can be integrated with the other detector elements.

As the $\lambda/4$ waveplate also acts as a weakly reflecting element, a separate element for performing this function is no longer needed, so that the costs of the scanning unit can be reduced.

It is also known to arrange just a $\lambda/4$ waveplate between the radiation source and the objective system in an optical scanning unit 10, without combining it with a polarization beam-splitting prism 75. Again, the function of the $\lambda/4$ waveplate is to rotate the plane of polarization of the scanning beam on its way through the unit, but the aim is now to ascertain that radiation of this beam arriving at the radiation source, i.e. parasitic radiation, has a direction of polarization which is different from that of the radiation emitted by the source. The parasitic radiation is thereby prevented form influencing the radiation emitted by the source. The invention can also be implemented in such an optical scanning unit by arranging the $\lambda/4$ waveplate between the moving mirror 17 and the objective system and leaving the waveplate surface that is directed towards the objective system uncoated.

Also the weakly reflecting surface of the flat weakly reflecting plate element 70, or of its alternative, the wedge, in the embodiment of FIG. 3, may be an uncoated surface.

The four quadrant signal detector 45 shown in the right bottom part of FIG. 3 has four detector elements 80, 81, 82, 83, which are separated from each other by strips 84, 85 extending in the radial direction r and tangential direction t, respectively. Such a signal detector 45 is used in combination with the so-called astigmatic focus error detection method. According to this method, the first reflected scanning beam 24 is made astigmatic, for example by arranging a cylindrical lens in front of the information detector 34. An astigmatic beam has two, mutually perpendicular, astigmatic focal lines instead of one focal spot. The planes in which these focal lines are situated have different axial positions. In a specific plane between these two planes, the astigmatic beam has a round cross-section. The information detector 34 is arranged in this specific plane. If the focus of the first convergent beam 21 is in the plane of the information layer 3, the first detection spot 32 on the information detector 34 is round and symmetric with respect to the four detector elements 80, 81, 82, 83, so that each of these four detector elements 80, 81, 82, 83 receives the same amount of information. If the focus of the first convergent beam 21 shifts in the axial direction with respect to the plane of the information layer 3, the astigmatic focal lines shift with respect to the plane of the information detector 34. This means that the first detection spot 32 on the information detector 34 becomes an elliptical spot in which the long axis of the ellipse is at an angle of +45° or −45° with respect to the radial and tangential directions, depending on the sign of the focus shift. By summing the output signals of the detector elements 81 and 83 and those of the detector elements 80 and 82 and subtracting the sum signals from each other, the focus error signal Sf is obtained.

The tracking error signal Sr is obtained by summing the signals of the detector elements 80 and 83 and those of the detector elements 81 and 82 and subtracting the sum signals from each other. This method of generating a tracking error signal Sr is known as the push-pull tracking error method.

The information signal Si is obtained by summing the output signals of the four detector elements 80,81,82 and 83.

Several focus error detection methods, alternative to the astigmatic method are known. The invention can be combined with each of these methods.

An alternative method of detecting tracking errors is the well-known three-spot tracking method. In addition to the scanning spot 23, the center of which should coincide with the center line of the information track 5 being scanned, two additional follower scanning spots, oppositely shifted in the radial direction with respect to the central scanning spot 23, are used in this method. The two follower scanning spots scan the two borders of the information track 5. The three scanning spots can be obtained by arranging a diffraction grating between the radiation source 11 and the beam separator 27 or beam splitting prism 75, which splits the scanning beam 15 from the radiation source 11 into one scanning beam and two tracking beams. After reflection at the information layer 3, the three beams are directed to the radiation-sensitive detection system 47 and focused thereon as three separate spots.

Figure 5:
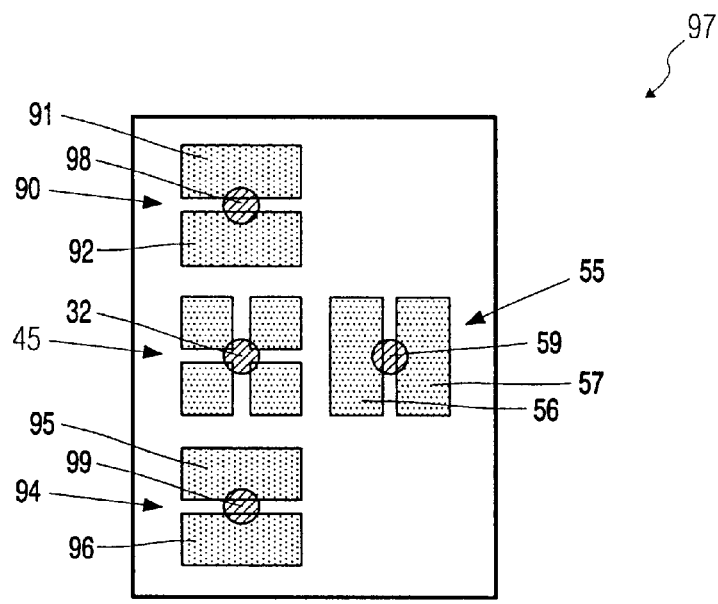
FIG. 5 is a top view of a radiation-sensitive detection system which can be used in such an optical unit.

FIG. 5 is a top view of a radiation-sensitive detection system 97 which may be used in combination with the three-spot tracking method. This radiation-sensitive detection system 97 comprises the four quadrant detector 45 for information read out and focus error detection, the mirror position detector 55 for mirror position detection and two additional (i.e., first and second, respectively) tracking detectors 90, 94 for tracking error detection. The detection spots 32, 59, 98, and 99, respectively, are projected on these detectors. The detection spots 98 and 99 are formed by said two tracking beams. The tracking error signal Sr is obtained by subtracting the output signals of the first and second tracking detectors 90 and 94 from each other.

As is also indicated in FIG. 5, each tracking detector 90 and 94 may be divided into two detector elements 91, 92 and 95, 96, respectively. In addition to the three-spot tracking error signal, push-pull signals may then also be obtained. This is known as the three-spot push-pull detection method.

Embodiments of the present invention have been disclosed. A person of ordinary skill in the art would realize, however, that certain modifications would come within the teachings of this invention. Therefore, the following claims should be studied to determine the true scope and content of the invention.

What is claimed is:

1. An optical unit for scanning an information plane having an optically readable and track-wise arranged structure, which unit comprises a radiation source for supplying a radiation beam, an objective system for focusing the radiation beam to a scanning spot in the information plane, an adjustable element for moving the scanning spot transversely to the track direction, a radiation-sensitive detection system for converting the radiation beam from the information plane into electric signals, and a position detection system for determining the position of the adjustable element, characterized in that the position detection system comprises a weakly reflecting element arranged in the path of the radiation beam between the adjustable element and the objective system for reflecting a portion of the radiation beam as a position-sensing beam towards a radiation-sensitive position detector comprising at least two detector elements.

2. An optical unit as claimed in claim 1, characterized in that the normal to the reflecting plane of the weakly reflecting element extends at a small angle to the optical axis of the objective system.

3. An optical unit as claimed in claim 2, characterized in that the position detector is arranged in the same plane as the radiation-sensitive detection system.

4. An optical unit as claimed in claim 1, characterized in that the reflecting element is a weakly reflecting flat plate, in which the normal to the plate surfaces extends at a small angle to the optical axis of the objective system.

5. An optical unit as claimed in claim 1, characterized in that the reflecting element is a weakly reflecting wedge having a small wedge angle.

6. An optical unit as claimed in claim 1, further comprising a λ/4 plate, arranged between the movable element and the objective system, characterized in that the weakly reflecting element is constituted by an uncoated surface of the λ/4 plate, which surface faces the objective system.

7. An optical unit as claimed in claim 1, characterized in that the movable element is a plane mirror.

8. An apparatus for reading information from and/or writing information in an information layer of an optical record carrier, which apparatus comprises supporting means for the record carrier, an optical unit for supplying a scanning beam focused to a scanning spot on the information layer, and means for moving the record carrier and the optical unit relative to each other, characterized in that the optical unit is a unit as claimed in claim 1.

* * * * *